US008686986B2

(12) United States Patent
Ikegami

(10) Patent No.: US 8,686,986 B2
(45) Date of Patent: Apr. 1, 2014

(54) IMAGE DISPLAY APPARATUS AND VOLTAGE CONTROL METHOD

(75) Inventor: Tomio Ikegami, Chino (JP)

(73) Assignee: Seiko Epson Corporation, Tokyo (JP)

( * ) Notice: Subject to any disclaimer, the term of this patent is extended or adjusted under 35 U.S.C. 154(b) by 1001 days.

(21) Appl. No.: 12/420,411

(22) Filed: Apr. 8, 2009

(65) Prior Publication Data

US 2009/0262104 A1  Oct. 22, 2009

(30) Foreign Application Priority Data

Apr. 16, 2008  (JP) .................................. 2008-106778

(51) Int. Cl.
*G09G 3/02* (2006.01)

(52) U.S. Cl.
USPC ........................................................ 345/212

(58) Field of Classification Search
None
See application file for complete search history.

(56) References Cited

U.S. PATENT DOCUMENTS

| 6,072,450 | A | * | 6/2000 | Yamada et al. ................. 345/76 |
| 7,773,080 | B2 | | 8/2010 | Sato et al. |
| 2006/0238613 | A1 | * | 10/2006 | Takayama et al. .............. 348/47 |
| 2008/0013574 | A1 | * | 1/2008 | Furuya et al. ..................... 372/6 |
| 2008/0158450 | A1 | * | 7/2008 | Tsuruta ............................ 349/33 |

FOREIGN PATENT DOCUMENTS

| JP | A-1-245780 | 9/1989 |
| JP | A-2004-333698 | 11/2004 |
| JP | A-2006-065148 | 3/2006 |
| JP | A-2006-091681 | 4/2006 |
| JP | A-2007-47354 | 2/2007 |
| JP | A-2008-003456 | 1/2008 |
| JP | A-2008-15001 | 1/2008 |
| JP | A-2008-176024 | 7/2008 |
| JP | A-2008-311991 | 12/2008 |

* cited by examiner

*Primary Examiner* — Jason Olson
(74) *Attorney, Agent, or Firm* — Oliff PLC

(57) ABSTRACT

An image display apparatus includes a light source, a scanner that scans an output beam emitted from the light source to forms an image on a projection surface, a light source driver that control intensity of the output beam emitted from the light source by controlling a drive current for driving the light source based on input image data, a light source drive power supply that supplies power to the light source driver, and a voltage controller that controls an output voltage from the light source drive power supply based on the input image data.

4 Claims, 9 Drawing Sheets

IMAGE DISPLAY APPARATUS AND VOLTAGE CONTROL METHOD

BACKGROUND

1. Technical Field

The present invention relates to an image display apparatus which scans the light emitted from a light source to form an image on a projection surface.

2. Related Art

An image display apparatus for displaying an image that has been proposed is, for example, a laser scan projector that uses laser beam scanning to display an image (see JP-A-1-245780 and JP-A-2007-47354, for example).

In a laser scan projector in which the laser beam undergoes intensity modulation in accordance with the grayscales of input image data, the intensity of the output beam is directly modulated in some cases by changing a drive current supplied to a laser diode, which is a laser light source. To change the drive current supplied to the laser diode, in general, a power supply is connected to the laser diode via a current driver, and the current driver adjusts the magnitude of the current necessary for the laser diode before the current is supplied.

Using the current driver to adjust the current supplied to the laser diode disadvantageously causes the current driver to consume power, resulting in associated increase in power consumption in the whole laser scan projector.

Such a problem is common to image display apparatus which scans the light emitted from a light source to form an image on a projection surface not only when the light source is a laser diode but also when the light source is an LED (Light Emitting Diode) or any other similar device.

SUMMARY

An advantage of some aspects of the invention is to provide a technology for reducing power consumption in an image display apparatus which scans the light emitted from a light source to form an image on a projection surface.

In order to solve at least part of the above problem, the invention can be implemented as the following forms or application examples.

FIRST APPLICATION EXAMPLE

An image display apparatus including: a light source, a scanner that scans an output beam emitted from the light source to forms an image on a projection surface, a light source driver that control intensity of the output beam emitted from the light source by controlling a drive current for driving the light source based on input image data, a light source drive power supply that supplies power to the light source driver, and a voltage controller that controls an output voltage from the light source drive power supply based on the input image data.

Since the light source driver controls the drive current for driving the light source based on input image data, supplying fixed voltage power to the light source driver causes the light source driver to waste part of the power. According to the image display apparatus in the first application example, however, controlling the output voltage based on input image data allows the power consumed in the light source driver to be reduced, for example, by limiting the voltage corresponding to the power to be supplied to the light source driver to a voltage necessary for the light source driver to produce a current to be supplied to the light source.

SECOND APPLICATION EXAMPLE

The image display apparatus according to the first application example, in which when the input image data are divided into predetermined data units, the voltage controller controls the output voltage to have a fixed voltage magnitude based on the image data that belong to each of the predetermined data units.

The "predetermined data units" include a variety of unit-related concepts, for example, on a frame basis, on a scan line basis, on a multiple scan line basis, on a pixel basis, and a multiple pixel basis. For example, the output voltage may be controlled to have a fixed voltage magnitude based on the peak or average of image data that belong to each of the predetermined data units.

A light source driver of related art receives power corresponding to a fixed voltage, and in this case, the supplied power corresponds to a voltage greater than or equal to the voltage necessary for the light source to produce the maximum intensity of light. In contrast, according to the image display apparatus in the second application example, the voltage corresponding to the power to be supplied to the light source driver is controlled for each of the predetermined data units based on the image data that belong to the predetermined data unit. Therefore, for example, when the image data contained in the predetermined data unit produces a dim image as a whole, reducing the voltage corresponding to the power to be supplied to the light source driver allows the power consumed in the light source driver to be reduced, whereby the power consumption in the image display apparatus can be reduced.

THIRD APPLICATION EXAMPLE

The image display apparatus according to the second application example, in which the fixed voltage magnitude is determined based on the maximum intensity among the intensities of the output beam emitted from the light source and corresponding to the image data that belong to the predetermined data unit.

According to the image display apparatus in the third application example, since the voltage magnitude corresponding to the power supplied to the light source driver is determined based on the maximum intensity among the intensities of the output beam emitted from the light source and corresponding to the image data that belong to the predetermined data unit, the voltage corresponding to the power supplied to the light source driver can be reduced to the minimum necessary voltage in the predetermined data unit. The power consumed in the light source driver can therefore be reduced, whereby the power consumption in the image display apparatus can be reduced.

The invention is not necessarily implemented in the aspect or the application examples of the image display apparatus described above, but can be implemented in a variety of aspects, such as a voltage control method and a computer program.

BRIEF DESCRIPTION OF THE DRAWINGS

The invention will now be described with reference to the accompanying drawings, wherein like numbers reference like elements.

DESCRIPTION OF EXEMPLARY EMBODIMENTS

Mode for carrying out the invention will be described below with reference to embodiments in the following order.
A. Embodiment
A-1. Configuration of rear-projection projector
A-1-1, Configuration of red image processing circuit
A-1-2. Configuration of red laser power supply circuit
A-1-3. Configuration of red laser driver
A-2. Control of red laser diode
A-3. Advantage of embodiment
B. Variations

A. Embodiment

A-1. Configuration of Rear-Projection Projector

Figure 1:
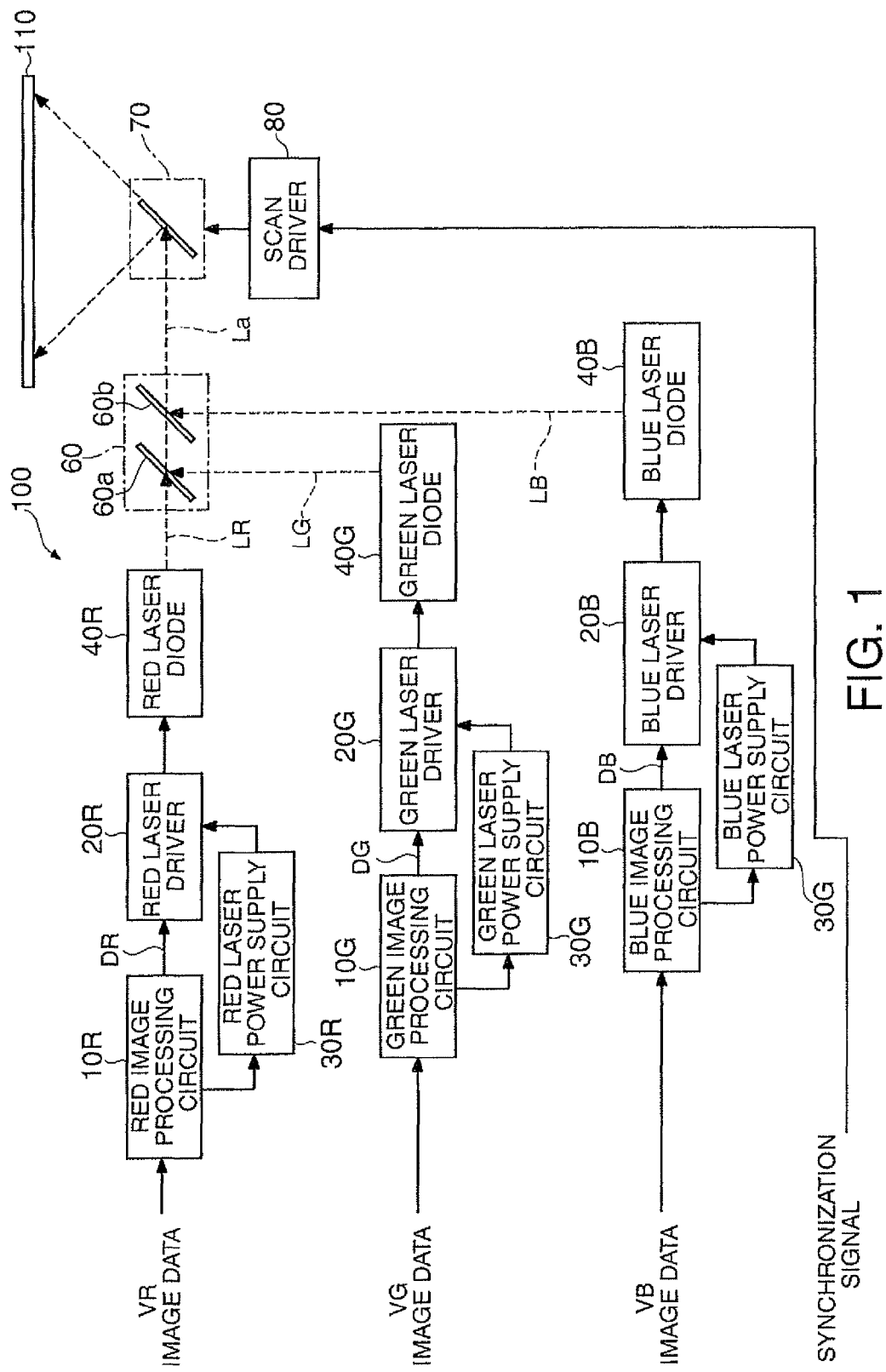
FIG. 1 is a block diagram showing a schematic configuration of a rear-projection projector as an embodiment of an image display apparatus of the invention.

FIG. 1 is a block diagram showing a schematic configuration of a rear-projection projector 100 as an embodiment of an image display apparatus of the invention. In the present embodiment, a laser scan display which scans a laser beam to display an image on a screen 110 is presented as the rear-projection projector 100.

As shown in FIG. 1, the rear-projection projector 100 primarily includes a red image processing circuit 10R, a red laser driver 20R, a red laser power supply circuit 30R, a red laser diode 40R, a green image processing circuit 10G, a green laser driver 20G, a green laser power supply circuit 30G, a green laser diode 40G, a blue image processing circuit 10B, a blue laser driver 20B, a blue laser power supply circuit 30B, a blue laser diode 40B, an optical axis alignment optical system 60, a laser scanner 70, and a scan driver 80.

In the rear-projection projector 100, the light intensities of the red laser diode 40R, the green laser diode 40G, and the blue laser diode 40B are controlled on a pixel basis based on red, green, and blue image data VR, VG, VB, respectively. A combined beam comprised of the laser beams emitted from the laser diodes 40R, 40G, and 40B scans the screen 110 to form an image thereon based on the image data.

The red image processing circuit 10R temporarily stores input image data VR in a frame memory (which will be described later), and then outputs the stored data as one-frame drawing data DR to the red laser driver 20R. The red image processing circuit 10R also outputs a voltage magnitude specifying signal ER to the red laser power supply circuit 30R, the voltage magnitude specifying signal ER controlling an output voltage Vcc from the red laser power supply circuit 30R based on the input image data VR.

The red laser driver 20R controls the light intensity of the red laser diode 40R by controlling a drive current for driving the red laser diode 40R based on the drawing data DR.

The red laser power supply circuit 30R applies a predetermined voltage to the red laser driver 20R based on the voltage magnitude specifying signal ER from the red image processing circuit 10R. In the present embodiment, the red laser power supply circuit 30R is controlled to apply a fixed voltage to the red laser driver 20R while the red laser driver 20R controls the red laser diode 40R based on the one-frame image data VR.

The configuration and operation of the green image processing circuit 10G and the blue image processing circuit 10B are the same as those of the red image processing circuit 10R. The configuration and operation of the green laser driver 20G and the blue laser driver 20B are the same as those of the red laser driver 20R. The configuration and operation of the green laser power supply circuit 30G and the blue laser power supply circuit 30B are the same as those of the red laser power supply circuit 30R. Accordingly, the configurations and operations of the red image processing circuit 10R, the red laser driver 20R, and the red laser power supply circuit 30R will be described below in detail, whereas the configurations and operations of the above components for green and blue will be omitted.

The optical axis alignment optical system 60 includes a first dichroic mirror 60a and a second dichroic mirror 60b, and aligns the optical axes of a red laser beam LR, a green laser beam LG, and a blue laser beam LB.

The first dichroic mirror 60a is disposed on an optical axis La and inclined thereto by 45 degrees. The first dichroic mirror 60a transmits the red laser beam LR along the optical axis La toward the second dichroic mirror 60b, whereas reflecting the green laser beam LG toward the second dichroic mirror 60b in such a way that the optical axis of the green laser beam LG coincides with the optical axis La.

The second dichroic mirror 60b is disposed on the optical axis La and inclined thereto by 45 degrees, as in the case of the first dichroic mirror 60a. The second dichroic mirror 60b transmits the red laser beam LR and the green laser beam LG along the optical axis La toward the laser scanner 70, whereas reflecting the blue laser beam LB toward the laser scanner 70 in such a way that the optical axis of the blue laser beam LB coincides with the optical axis La.

That is, the second dichroic mirror 60b allows a combined beam (hereinafter sometimes simply referred to as "laser beam") comprised of the red laser beam LR, the green laser beam LG, and the blue laser beam LB to travel toward the laser scanner 70.

The laser scanner 70 is a resonant MEMS (Micro Electro Mechanical System) scanner, and scans the laser beam incident through the optical axis alignment optical system 60 on the screen 110 based on a scan drive signal inputted from the scan driver 80.

The scan driver 80 generates a scan drive signal for driving the laser scanner 70 based on a synchronization signal inputted from an external image supplier along with the image data VR, VG, and VB, and outputs the generated scan drive signal to the laser scanner 70.

The screen 110 is a transmissive screen that transmits the laser beam scanned by the laser scanner 70. That is, a user views a displayed image on the side of the screen 110 opposite the side irradiated with the laser beam. In the rear-projection projector 100 in the present embodiment, only the viewing side of the screen 110 is exposed to the outside, whereas the other components are housed in an enclosure not to be affected by external light.

The red laser diode 40R, the green laser diode 40G, and the blue laser diode 40B in the present embodiment correspond to the light source in the claims. The red laser driver 20R, the green laser driver 20G, and the blue laser driver 20B in the present embodiment correspond to the light source driver in the claims. The red laser power supply circuit 30R, the green laser power supply circuit 30G, and the blue laser power supply circuit 30B in the present embodiment correspond to the light source drive power supply in the claims. The red image processing circuit 10R, the green image processing circuit 10G, and the blue image processing circuit 10B in the present embodiment correspond to the voltage controller in the claims. The laser scanner 70 in the present embodiment corresponds to the scanner in the claims. The screen 110 in the present embodiment corresponds to the projection surface in the claims.

Figure 2:
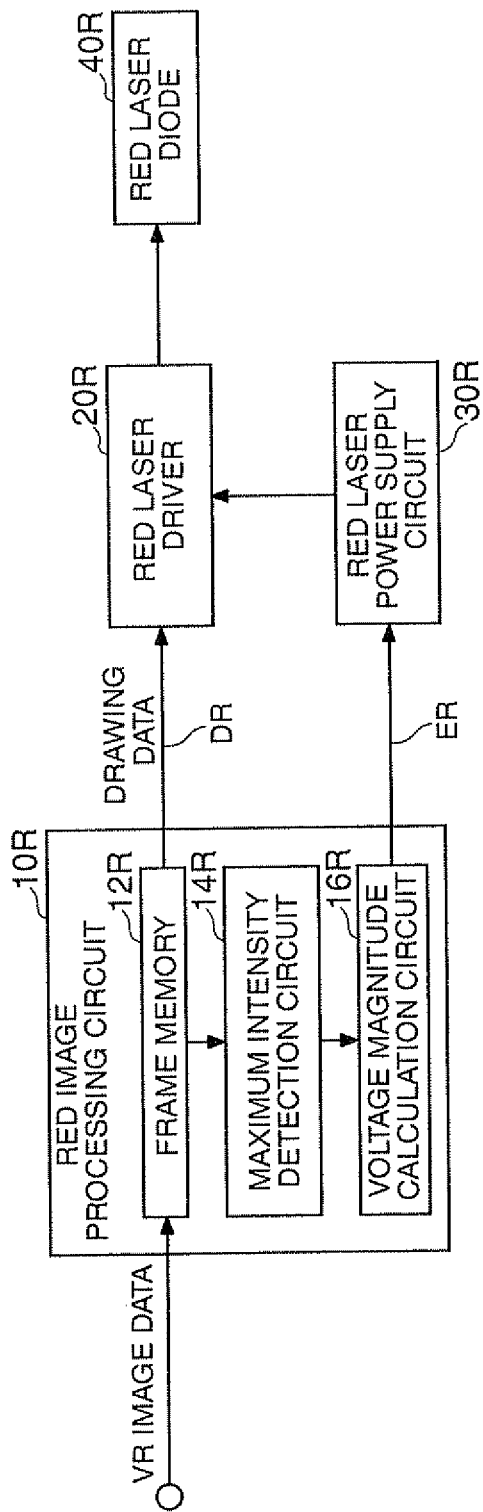
FIG. 2 is a block diagram showing a schematic configuration of a red image processing circuit.

A-1-1. Configuration of Red Image Processing Circuit:

FIG. 2 is a block diagram showing a schematic configuration of the red image processing circuit 10R. As shown in FIG. 2, the red image processing circuit 10R includes a frame memory 12R, a maximum intensity detection circuit 14R, and a voltage magnitude calculation circuit 16R. The frame memory 12R accumulates the red image data VR on a frame basis, which is inputted from a DVD player or any other suitable external image supplier (not shown). In the present embodiment, the image data VR are 4-bit serial data for the sake of simplicity of the description. That is, the rear-projection projector 100 in the present embodiment can display an image having 16 grayscales (4096 colors) from the grayscale "0" to the grayscale "15".

FIGS. 3A to 3E conceptually is conceptual diagrams showing in concept how the maximum intensity detection circuit 14R and the voltage magnitude calculation circuit 16R determine the magnitude of the output voltage Vcc from the red laser power supply circuit 30R. FIGS. 3A to 3E show the magnitude Vi(n) (n=1, 2, 3, . . . ) of the output voltage Vcc from the red laser power supply circuit 30R for consecutive three frames along with the timing at which image data are externally inputted to the red image processing circuit 10R and the timing at which the drawing data DR are inputted to the red laser driver 20R. The variable n represents the frame number, and the illustration in FIGS. 3A to 3E corresponds to the frames (N−1) to (N+2).

Figure 3:
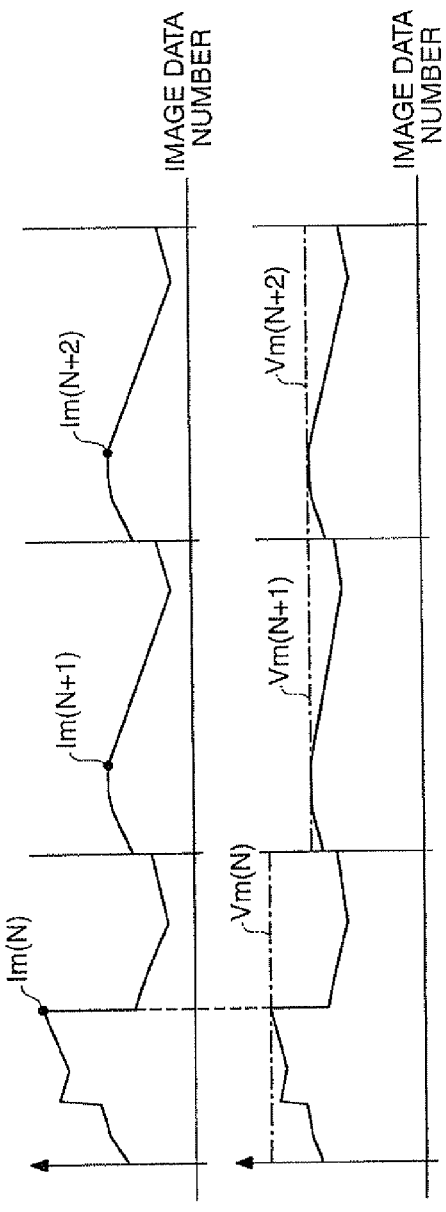
FIGS. 3A to 3E are conceptual diagrams showing in concept how to determine the magnitude of an output voltage Vcc from a red laser power supply circuit.

FIG. 3A shows the frame number of the image data VR inputted to the red image processing circuit 10R. FIG. 3B shows the light intensity (mW) of the red laser diode 40R, which corresponds to the image data VR. FIG. 3C shows a drive voltage (V) necessary for the red laser diode 40R to produce the light intensity shown in FIG. 3B. FIG. 3D shows the frame number of the drawing data DR inputted to the red laser driver 20R. FIG. 3E shows the output voltage Vcc (V) from the red laser power supply circuit 30R, which corresponds to the frame number of the drawing data DR shown in FIG. 3D.

The maximum intensity detection circuit 14R detects the maximum intensity of the output beam to be emitted from the red laser diode 40R based on the one-frame image data VR stored in the frame memory 12R. Specifically, the light intensity of the red laser diode 40R necessary to reproduce an image based on the image data VR is determined in advance, and the relationship between the image data VR and the light intensity of the red laser diode 40R is stored as a map in a memory (not shown) provided in the red image processing circuit 10R.

The maximum intensity detection circuit 14R refers to the map described above to determine the light intensities that correspond to the one-frame image data VR stored in the frame memory 12R. For example, as shown in FIG. 3B, the light intensities necessary to form the images contained in the frames (N) to (N+2) are determined. In this way, the maximum intensity Im(N), Im(N+1), and Im(N+2) are detected for the respective frames.

Figure 4:
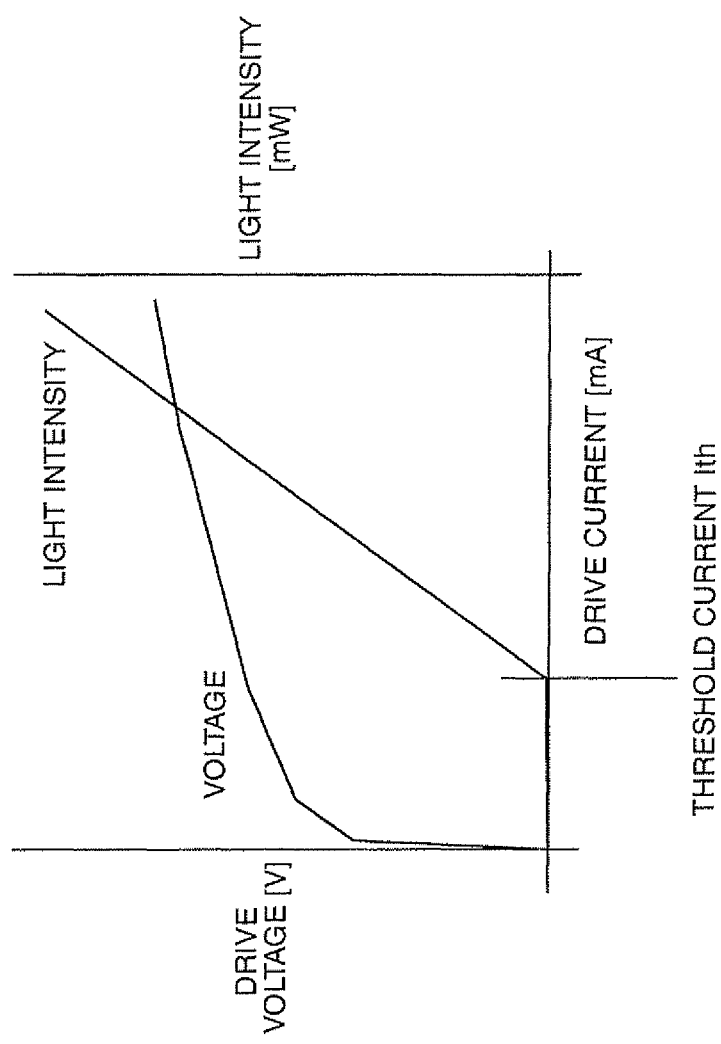
FIG. 4 shows the drive voltage-drive current-light intensity characteristic of a red laser diode.

FIG. 4 shows the drive voltage-drive current-light intensity characteristic of the red laser diode 40R, The voltage magnitude calculation circuit 16R uses the maximum intensity Im(n) detected by the maximum intensity detection circuit 14R to calculate the magnitude Vi(n) of the output voltage Vcc from the red laser power supply circuit 30R necessary for the red laser diode 40R to produce the maximum intensity Im(n).

A specific description will be made below with reference to FIGS. 3A to 3E. The map representing the drive voltage-drive current-light intensity characteristic of the red laser diode 40R shown in FIG. 4 is stored in advance in a memory (not shown) provided in the red image processing circuit 10R. For example, the image data contained in the frame (N) shown in FIGS. 3A to 3E will be described. First, the voltage magnitude calculation circuit 16R refers to the map representing the drive voltage-drive current-light intensity characteristic of the red laser diode 40R to determine the drive voltage Vm(N) necessary for the red laser diode 40R to produce the maximum intensity Im(N) detected by the maximum intensity detection circuit 14R (FIG. 3C). The voltage magnitude calculation circuit 16R adds a voltage drop Vs (fixed value) which occurs in the red laser driver 20R to the drive voltage Vm to determine the magnitude Vi(N) of the voltage applied to the red laser driver 20R (FIG. 3E). The voltage magnitude specifying signal ER indicative of the voltage magnitude Vi(N) is outputted to the red laser power supply circuit 30R.

A-1-2. Configuration of Red Laser Power Supply Circuit

The red laser power supply circuit 30R controls the voltage applied to the red laser driver 20R (that is, the output voltage Vcc from the red laser power supply circuit 30R) to have the voltage magnitude Vi(n) based on the voltage magnitude specifying signal ER inputted from the voltage magnitude calculation circuit 16R described above, and applies the resultant voltage to the red laser driver 20R. As described above, the red laser power supply circuit 30R controls the output voltage Vcc based on the image data VR on a frame basis.

Figure 5:
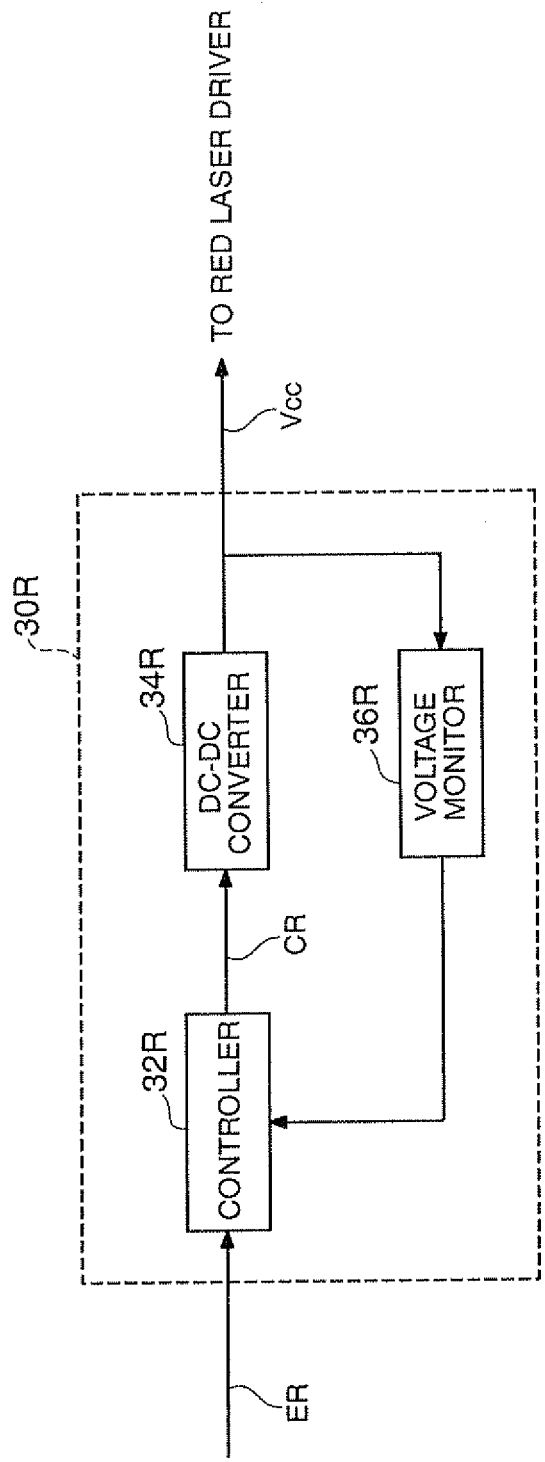
FIG. 5 is a block diagram schematically showing the configuration of the red laser power supply circuit.

FIG. 5 is a block diagram schematically showing the configuration of the red laser power supply circuit 30R. The red laser power supply circuit 30R includes a controller 32R, a DC-DC converter 34R, and a voltage monitor 36R. The red laser power supply circuit 30R performs feedback control involving using the voltage monitor 36R to monitor the output voltage from the DC-DC converter 34R, using the controller 32R to determine the difference between the monitored voltage magnitude and the voltage magnitude Vi(n) specified by the voltage magnitude specifying signal ER, and controlling the DC-DC converter 34R to set the output voltage Vcc to the voltage magnitude Vi(n).

In the present embodiment, as will be described later, the red laser driver 20B changes the output current (that is, the red laser driver 20R changes its internal resistance) based on the image data VR. Therefore, even when the controller 32R sends a control signal CR for turning transistors SWA and SWB, which will be described later, on and off to the DC-DC converter 34R based on the voltage magnitude specifying signal ER, the output voltage from the DC-DC converter 34R is not set to the specified voltage magnitude in some cases. In this case, the output voltage can be more accurately controlled by performing the feedback control as described above.

Figure 6:
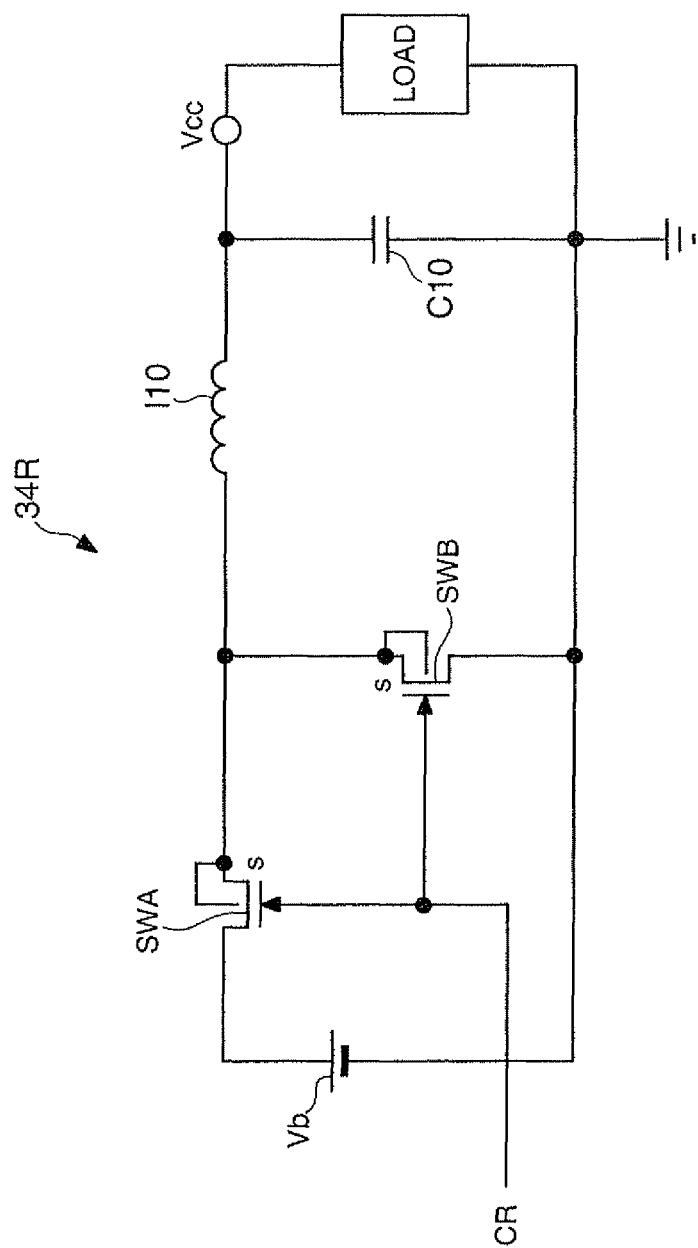
FIG. 6 schematically shows the circuit configuration of a DC-DC converter.
Figure 7:
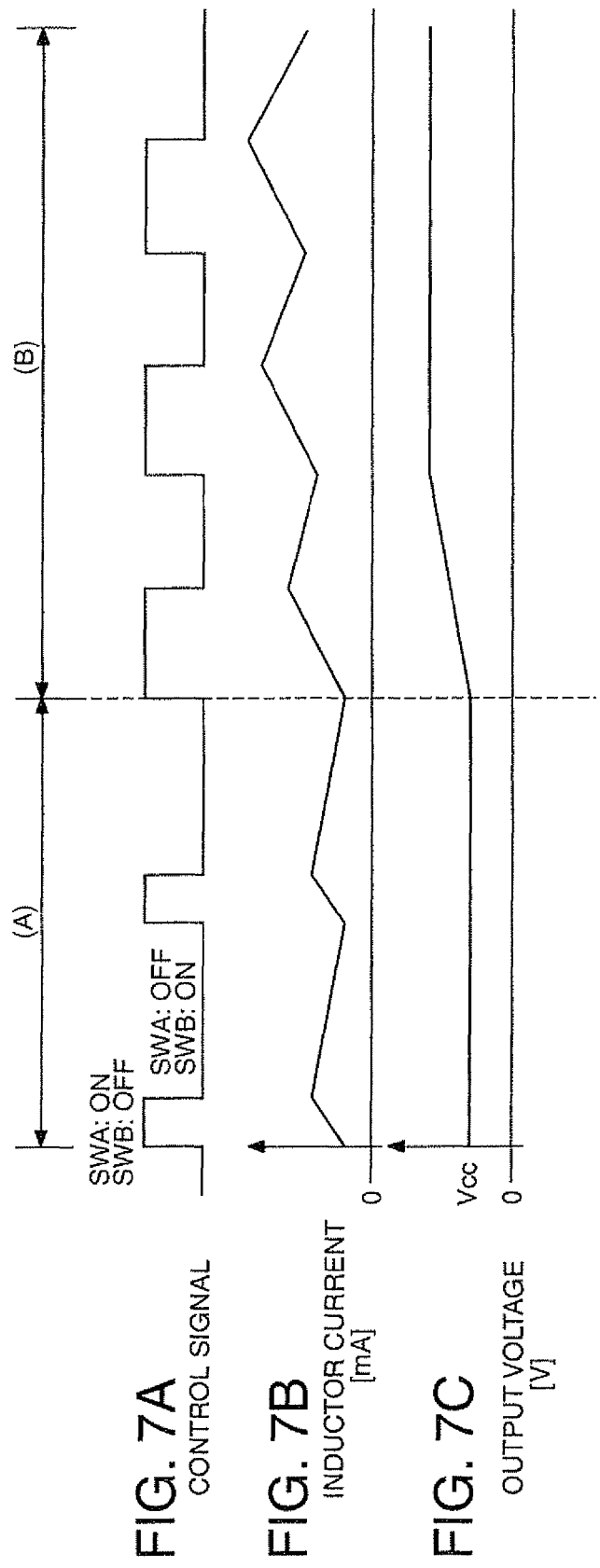
FIGS. 7A to 7C show the relationship of operations of transistors with an output voltage.

FIG. 6 schematically shows the circuit configuration of the DC-DC converter 34R, and FIGS. 7A to 7C show the relationship of operations of the transistors SWA and SWB with the current flowing through an inductor I10 and the output voltage Vcc. The DC-DC converter 34R includes a principal power supply Vb, the transistor SWA, the transistor SWB, the inductor I10, and a capacitor C10. The load in FIG. 6 corresponds to the red laser driver 20R in the present embodiment.

Each of the transistors SWA and SWB operates as a switch. The DC-DC converter 34R is configured to accumulate energy in the inductor I10 by switching the two transistors SWA and SWB between on and off, smooth a voltage in the capacitor C10, and apply a predetermined voltage to the load. The output voltage is controlled by changing the on/oft periods of the transistors SWA and SWB based on the control signal CR from the controller 32R, as shown in FIG. 7A.

For example, when the period during which the transistor SWA is on and the transistor SWB is off is short (the (A) period in FIGS. 7A to 7C), the current flowing through the inductor 110 is small as illustrated, resulting in a low electric charge charged across the capacitor C10. The output voltage Vcc therefore becomes low. On the other hands when the period during which the transistor SWA is on and the transistor SWB is off is long (the (B) period in FIGS. 7A to 7C), the current flowing through the inductor I10 is large as illustrated, resulting in a high electric charge charged across the capacitor C10. The output voltage Vcc can therefore be high.

As described above, the DC-DC converter 34R can precisely control the output voltage Vcc in accordance with the control signal CR. Further, since the DC-DC converter 34R controls the voltage by the switching operations of the transistors SWA and SWB, the voltage conversion can be carried out with a low associated voltage drop at high power efficiency.

A-1-3. Configuration of Red Laser Driver

The red laser driver 20R supplies the drive current according to the drawing data DR, which is supplied from the red image processing circuit 10R, to the red laser diode 40R. The configuration of the red laser driver 20R will be described below in detail with reference to FIG. 8.

Figure 8:
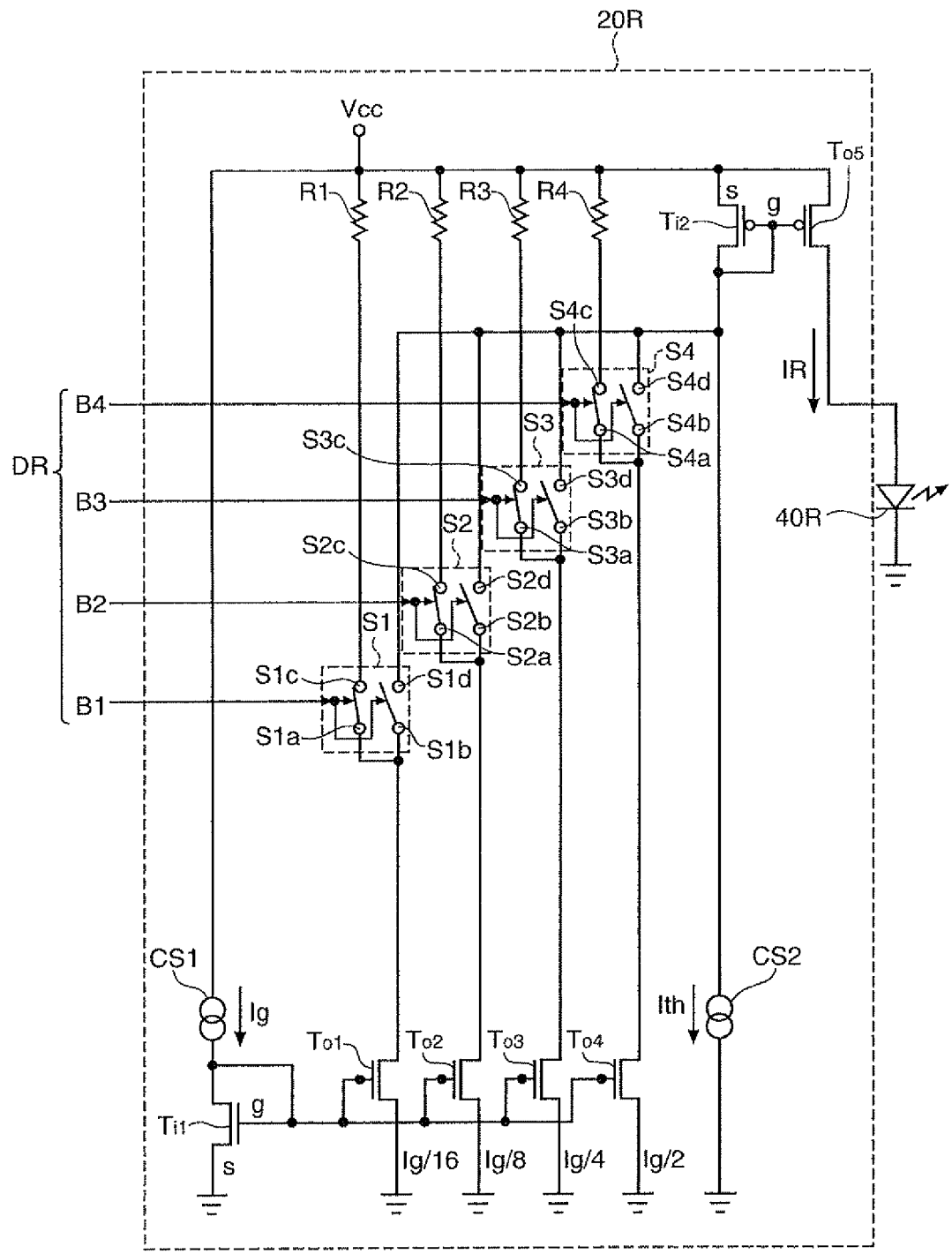
FIG. 8 schematically shows the circuit configuration of a red laser driver.

FIG. 8 schematically shows the circuit configuration of the red laser driver 20R. As illustrated, the red laser driver 20R includes a first current source CS1, a second current source CS2, a first input-side transistor device Ti1, a second input-side transistor device Ti2, a first output-side transistor device To1, a second output-side transistor device To2, a third output-side transistor device To3, a fourth output-side transistor device To4, a fifth output-side transistor device To5, a first output switch S1, a second output switch S2, a third output switch S3, a fourth output switch S4, a first dummy load R1, a second dummy load R2, a third dummy load R3, and a fourth dummy load R4.

The first current source CS1 has an input terminal connected to the output terminal of the red laser power supply circuit 30R (output voltage Vcc) and an output terminal connected to the drain and gate terminals of the first input-side transistor device Ti1. The first current source CS1 is configured to produce a current having a fixed magnitude Ig even when the magnitude of the output voltage Vcc from the red laser power supply circuit 30R is changed.

The first input-side transistor device Ti1 is an n-channel MOS (Metal Oxide Semiconductor) transistor device with the drain terminal thereof connected to the output terminal of the first current source CS1, the gate terminal connected to the output terminal of the first current source CS1 and the gate terminals of the first to fourth output-side transistor devices To1 to To4, and the source terminal connected to a ground line.

The first output-side transistor device To1 is an n-channel MOS transistor device with the drain terminal thereof connected to one terminal of the first output switch S1, the gate terminal connected to the gate terminal of the first input-side transistor device Ti1 and the gate terminals of the second to fourth output-side transistor devices To2 to To4, and the source terminal connected to the ground line.

The second output-side transistor device To2 is also an n-channel MOS transistor device, as in the case of the first output-side transistor device To1, with the drain terminal thereof connected to one terminal of the second output switch S2, the gate terminal connected to the gate terminals of the first input-side transistor device Ti1, the first output-side transistor device To1, the third output-side transistor device To3, and the fourth output-side transistor device To4, and the source terminal connected to the ground line.

The third output-side transistor device To3 is also an n-channel MOS transistor device, as in the case of the first output-side transistor device To1, with the drain terminal thereof connected to one terminal of the third output switch S3, the gate terminal connected to the gate terminals of the first input-side transistor device Ti1, the first output-side transistor device To1, the second output-side transistor device To2, and the fourth output-side transistor device To4, and the source terminal connected to the ground line.

The fourth output-side transistor device To4 is also an n-channel MOS transistor device, as in the case of the first output-side transistor device To1, with the drain terminal thereof connected to one terminal of the fourth output switch S4, the gate terminal connected to the gate terminals of the first input-side transistor device Ti1, the first output-side transistor device To1, the second output-side transistor device To2, and the third output-side transistor device To3, and the source terminal connected to the ground line.

That is, the first current source CS1, the first input-side transistor device Ti1, and the first to fourth output-side transistor devices To1 to To4 form a current mirror circuit in which the first input-side transistor device Ti1 is an input-side transistor and the first to fourth output-side transistor devices To1 to To4 are an output-side transistor (that is, a current source). In the present embodiment, the electric characteristics of the first to fourth output-side transistor devices To1 to To4 are set in such a way that the first to fourth output-side transistor devices To1 to To4 produce currents according to the bit data corresponding thereto.

Specifically, the first output-side transistor device To1 corresponds to first bit or LSB data B1 of the 4-bit drawing data DR, and has electric characteristics set in such a way that the first output-side transistor device To1 produces a current the magnitude of which is one-sixteenth the current (the magnitude of which is Ig) produced by the first current source CS1.

The second output-side transistor device To2 corresponds to second bit data B2 of the 4-bit drawing data DR, and has electric characteristics set in such a way that the second output-side transistor device To2 produces a current the magnitude of which is one-eighth the current (the magnitude of which is Ig) produced by the first current source CS1.

The third output-side transistor device To3 corresponds to third bit data B3 of the 4-bit drawing data DR, and has electric characteristics set in such a way that the third output-side transistor device To3 produces a current the magnitude of which is one-fourth the current (the magnitude of which is Ig) produced by the first current source CS1.

The fourth output-side transistor device To4 corresponds to fourth bit or MSB data B4 of the 4-bit drawing data DR, and has electric characteristics set in such a way that the fourth output-side transistor device To4 produces a current the magnitude of which is one-half the current (the magnitude of which is Ig) produced by the first current source CS1.

The first dummy load R1 is a resistor element having a predetermined resistance with one end thereof connected to the output terminal (output voltage Vcc) of the red laser power supply circuit 30R and the other end connected to a third terminal S1c of the first output switch S1.

The second dummy load R2 is also a resistor element having a predetermined resistance with one end thereof connected to the output terminal (output voltage Vcc) of the red laser power supply circuit 30R and the other end connected to a third terminal S2c of the second output switch S2.

The third dummy load R3 is also a resistor element having a predetermined resistance with one end thereof connected to the output terminal (output voltage Vcc) of the red laser power supply circuit 30R and the other end connected to a third terminal S3c of the third output switch S3.

The fourth dummy load R4 is also a resistor element having a predetermined resistance with one end thereof connected to the output terminal (output voltage Vcc) of the red laser power supply circuit 30R and the other end connected to a third terminal S4c of the fourth output switch S4.

The first output switch S1 is provided in correspondence with the first bit or LSB data B1 of the 4-bit drawing data DR, and is a switching device for connecting and disconnecting a first terminal S1a to and from the third terminal S1c and a second terminal S1b to and from a fourth terminal S1d in accordance with the value of the bit data B1.

The first terminal S1a and the second terminal S1b are connected to the drain terminal of the first output-side transistor device To1. The third terminal S1c is connected to the other end of the first dummy load R1. The fourth terminal S1d is connected to the input terminal of the second current source CS2.

In the present embodiment, when the bit data B1 is "1", the first terminal S1a is disconnected from the third terminal S1c and the second terminal S1b is connected to the fourth terminal S1d, whereas when the bit data B1 is "0", the first terminal S1a is connected to the third terminal S1c and the second terminal S1b is disconnected from the fourth terminal S1d.

The second output switch S2 is provided to correspond with the second bit data B2 of the 4-bit drawing data DR, and is a switching device for connecting and disconnecting a first terminal S2a to and from the third terminal S2c and a second terminal S2b to and from a fourth terminal S2d in accordance with the value of the bit data B2.

The first terminal S2a and the second terminal S2b are connected to the drain terminal of the second output-side transistor device To2. The third terminal S2c is connected to the other end of the second dummy load R2. The fourth terminal S2d is connected to the input terminal of the second current source CS2.

In the present embodiment, when the bit data B2 is "1", the first terminal S2a is disconnected from the third terminal S2c and the second terminal S2b is connected to the fourth terminal S2d, whereas when the bit data B2 is "0", the first terminal S2a is connected to the third terminal S2c and the second terminal S2b is disconnected from the fourth terminal S2d.

The third output switch S3 is provided to correspond with the third bit data B3 of the 4-bit drawing data DR, and is a switching device for connecting and disconnecting a first terminal S3a to and from the third terminal S3c and a second terminal S3b to and from a fourth terminal S3d in accordance with the value of the bit data 33.

The first terminal S3a and the second terminal S3b are connected to the drain terminal of the third output-side transistor device To3. The third terminal S3c is connected to the other end of the third dummy load R3. The fourth terminal S3d is connected to the input terminal of the second current source CS2.

In the present embodiment, when the bit data B3 is "1", the first terminal S3a is disconnected from the third terminal S3c and the second terminal S3b is connected to the fourth terminal S3d, whereas when the bit data B3 is "0", the first terminal S3a is connected to the third terminal S3c and the second terminal S3b is disconnected from the fourth terminal S3d.

The fourth output switch S4 is provided to correspond with the fourth bit or MSB data B4 of the 4-bit drawing data DR, and is a switching device for connecting and disconnecting a first terminal S4a to and from the third terminal S4c and a second terminal S4b to and from a fourth terminal S4d in accordance with the value of the bit data 34.

The first terminal S4a and the second terminal S4b are connected to the drain terminal of the fourth output-side transistor device To4. The third terminal S4c is connected to the other end of the fourth dummy load R4. The fourth terminal S4d is connected to the input terminal of the second current source CS2.

In the present embodiment, when the bit data B4 is "1", the first terminal S4a is disconnected from the third terminal S4c and the second terminal S4b is connected to the fourth terminal S4d, whereas when the bit data B4 is "0", the first terminal S4a is connected to the third terminal S4c and the second terminal S4b is disconnected from the fourth terminal S4d.

The input terminal of the second current source SC2 is connected to the fourth terminals S1d to S4d of the first to fourth output switches S1 to S4 and the drain and gate terminals of the second input-side transistor device Ti2, and the output terminal of the second current source SC2 is connected to the ground line. The second current source SC2 produces a threshold current Ith of the red laser diode 40R.

As shown in FIG. 4, the threshold current Ith is the magnitude of current necessary for the red laser diode 40R to emit a laser beam. More exactly, supplying the threshold current Ith to the red laser diode 40R does not cause laser beam emission (that is, the intensity is "0"), but supplying a drive current greater than the threshold current Ith to the red laser diode 40R cause laser beam emission. That is, the light intensity increases or decreases in proportion to the current magnitude obtained by subtracting the threshold current Ith from the drive current IR supplied to the red laser diode 40R.

The second input-side transistor device Ti2 is a p-channel MOS transistor device with the source terminal thereof connected to the output terminal (output voltage Vcc) of the red laser power supply circuit 30R, the gate terminal connected to the drain terminal of the second input-side transistor device Ti2 itself and the gate terminal of the fifth output-side transistor device To5, and the drain terminal connected to the input terminal of the second current source SC2 and the fourth terminals S1d to S4d of the first to fourth output switches S1 to S4.

The fifth output-side transistor device To5 is a p-channel MOS transistor device with the source terminal thereof connected to the output terminal (output voltage Vcc) of the red laser power supply circuit 30R, the gate terminal connected to the gate and drain terminals of the second input-side transistor device Ti2, and the drain terminal connected to the anode terminal of the red laser diode 40R.

That is, the second input-side transistor device Ti2 and the fifth output-side transistor device To5 form a current mirror circuit in which the second input-side transistor device Ti2 is the input side and the fifth output-side transistor device To5 is the output side. The current mirror circuit receives as an input a combined current comprised of the threshold current Ith produced by the second current source SC2 and the currents flowing through the fourth terminals S1d to S4d of the first to fourth output switches S1 to S4, and outputs a current the magnitude of which is substantially the same as that of the combined current as the drive current IR to the red laser diode 40R.

As seen from the above description, the red laser driver 20R is configured to output the currents produced by the first to fourth output-side transistor devices To1 to To4 to either the corresponding first to fourth dummy loads R1 to R4 or the red laser diode 40R, which is the light source, by switching the first to fourth output switches S1 to S4 between the connection and disconnection in accordance with the drawing data DR.

For example, when the drawing data DR has a grayscale of "0", that is, all the bit data B1 to B4 are "0", the currents produced by the first to fourth output-side transistor devices To1 to To4 flow through the corresponding first to fourth dummy loads R1 to R4, resulting in the drive current IR=the threshold current Ith. In this case, the red laser diode 40R emits no laser beam, as shown in FIG. 4. That is, red does not contribute to color image formation at all.

When the drawing data DR has a grayscale of "1" that is, the bit data B1 is "1" and the bit data B2 to B4 are "0", only the first output-side transistor device To1 is connected to the input terminal of the second current source SC2, resulting in the drive current IR=the threshold current Ith+Ig/16. In this case, the red laser diode 40R emits a laser beam the intensity of which accords with the current magnitude Ig/16 (that is, the intensity according to the grayscale "1") obtained by subtracting the threshold current Ith from the drive current IR.

When the drawing data DR has a grayscale of "2", that is, the bit data B2 is "1" and the bit data B1, B3, and B4 are "0", only the second output-side transistor device To2 is connected to the input terminal of the second current source SC2, resulting in the drive current IR=the threshold current Ith+Ig/8. In this case, the red laser diode 40R emits a laser beam the intensity of which accords with the current magnitude Ig/8 (that is, the intensity according to the grayscale "2") obtained by subtracting the threshold current Ith from the drive current IR.

As described above, the drive current IR increments by Ig/16 as the grayscale increments by "1". When the grayscale is the maximum value "15", that is, all the bit data B1 to B4 are "1", all the first to fourth output-side transistor devices To1 to To4 are connected to the input terminal of the second current source SC2, resulting in the drive current IR=the threshold current Ith+15×Ig/16. In this case, the red laser diode 40R emits a laser beam the intensity of which accords with the current magnitude 15×Ig/16 (that is, the intensity according to the maximum grayscale "15") obtained by subtracting the threshold current Ith from the drive current IR.

The red laser diode 40R emits a monochrome red laser beam in accordance with the drive current IR supplied from the red laser driver 20R described above, and directs the laser beam toward the optical axis alignment optical system 60.

A-2. Control of Red Laser Diode

Figure 9:
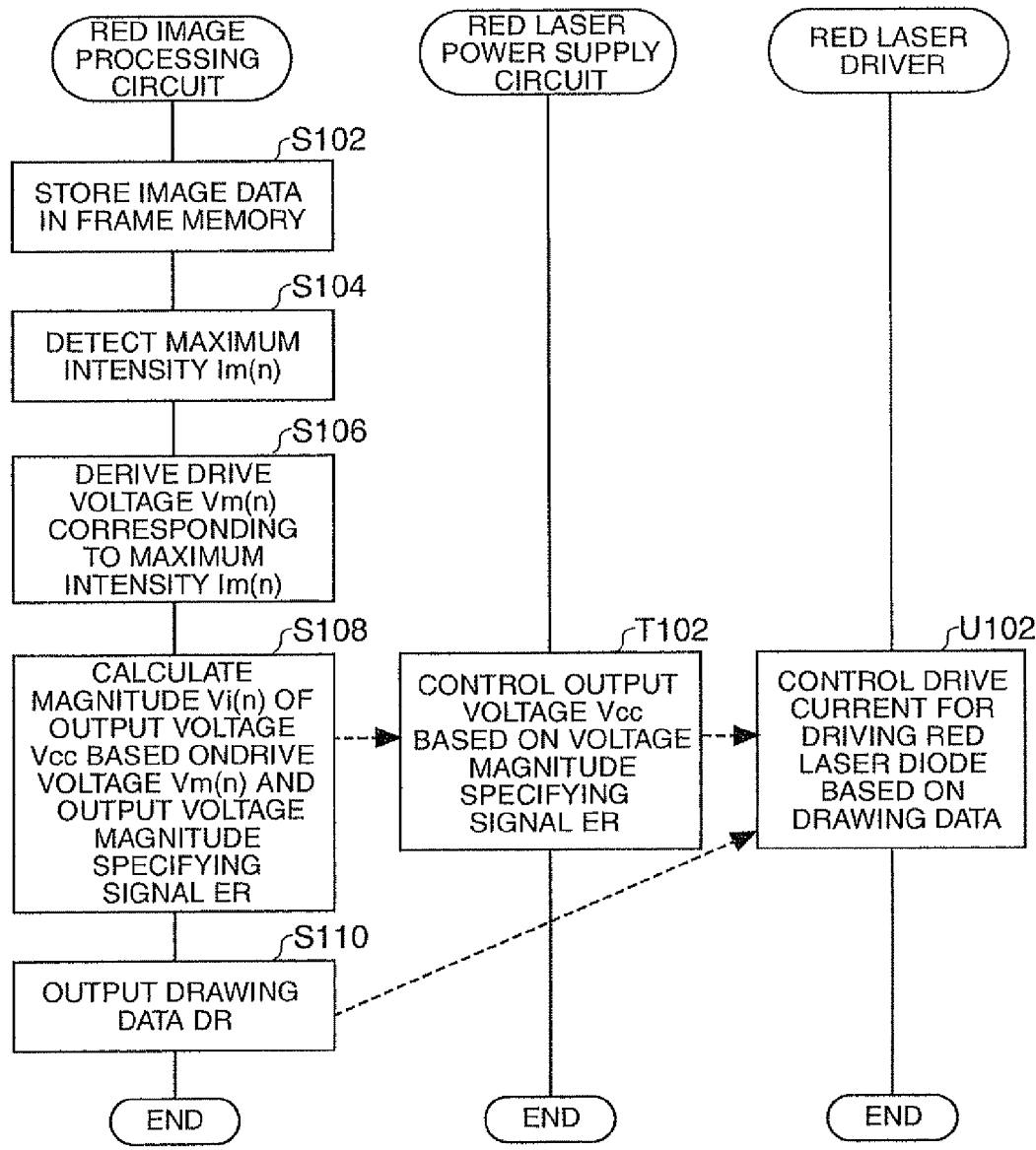
FIG. 9 is a flowchart showing the procedure of controlling the red laser diode.

A method for controlling the red laser diode 40R in the rear-projection projector 100 will be briefly described with reference to FIG. 9 and the illustration of the case where the red laser diode 40R is controlled based on the image data VR contained in the frame (N) shown in FIGS. 3A to 3E. FIG. 9 is a flowchart showing the procedure of controlling the red laser diode 40R.

First, when the image data VR is inputted to the rear-projection projector 100, the red image processing circuit 10R stores the image data VR in the frame memory 12R on a frame basis. When the image data VR contained in the frame (N) is stored in the frame memory 12R (step S102), the maximum intensity detection circuit 14R refers to the map representing the relationship between the image data VR and the light intensity of the red laser diode 40R, which has been described above, to derive the light intensity corresponding to the image data VR contained in the frame (N) and detect the maximum light intensity (maximum intensity Im(N)) among the light intensities in the single frame (step S104).

The voltage magnitude calculation circuit 16R then refers to the map representing the drive voltage-drive current-light intensity characteristic of the red laser diode 40R, which has been described above, to derive the drive voltage Vm(N) necessary for the red laser diode 40R to emit an output beam having the maximum intensity Im(N) based on the maximum intensity Im(N) (step S106). The voltage magnitude calculation circuit 16R adds the voltage drop Vs to the drive voltage Vm(N) to calculate the magnitude Vi(N) of the output voltage Vcc from the red laser power supply circuit 30R, and outputs the voltage magnitude specifying signal ER to the red laser power supply circuit 30R (step S108).

The red laser power supply circuit 30R then controls the output voltage Vcc to have the voltage magnitude Vi(N) based on the voltage magnitude specifying signal ER and applies the voltage to the red laser driver 20R (step T102).

The red image processing circuit 10R, after having outputted the voltage magnitude specifying signal ER to the red laser power supply circuit 30R in the step S108, outputs the drawing data DR corresponding to the frame (N) to the red laser driver 20R in synchronization with the application of the voltage having the magnitude Vi(N) from the red laser power supply circuit 30R to the red laser driver 20R (step S110).

The red laser driver 20R then uses the power corresponding to the voltage magnitude Vi(N) and supplied from the red laser power supply circuit 30R to produce a current according to the drawing data DR and supplies the current to the red laser diode 40R (step U102). The red laser power supply circuit 30R keeps supplying the fixed power corresponding to the voltage magnitude Vi(N) to the red laser driver 20R throughout the period when the red laser driver 20R controls the current supplied to the red laser diode 40R based on the drawing data DR corresponding to the frame (N). The output beam from the red laser diode 40R is thus modulated based on the image data VR.

As described above, repeating the processes in the steps S102 to S110 carried out by the red image processing circuit 10R, the process in the step T102 carried out by the red laser power supply circuit 30R, and the process in the step U102 carried out by the red laser driver 20R on a frame basis for a plurality of consecutive frames allows the output beam from the red laser diode 40R to be modulated based on the image data comprised of the plurality of consecutive frames The step S104 in the present embodiment corresponds to (a) in the claims. The steps S106 and S108 in the present embodiment correspond to (b) in the claims. The step T102 in the present embodiment corresponds to (c) in the claims. The voltage magnitude Vi(N) in the present embodiment corresponds to the output voltage specifying value in the claims.

A-3. Advantage of Embodiment

As described above, in the rear-projection projector 100 in the present embodiment, the red image processing circuit 10R calculates a voltage necessary to drive the red laser diode 40R on a frame basis, produces the necessary voltage in the red laser power supply circuit 30R, and applies the voltage to the red laser driver 20R.

For example, as shown in FIG. 3B, the image as a whole during the frame (N+1) is dimmer than the image during the frame (N), and the maximum intensity Im(N+1) is lower than the maximum intensity Im(N). Therefore, as shown in FIG. 3E, the output voltage Vcc from the red laser power supply circuit 30R needs to have the voltage magnitude Vi(N) during the frame (N), whereas the output voltage Vcc only needs to have the voltage magnitude Vi(N+1) (smaller than the voltage magnitude Vi(N)) during the frame (N+1).

Therefore, supplying an appropriate voltage on a frame basis, for example, applying the voltage having the magnitude Vi(N) to the red laser driver 20R when the red laser diode 40R is controlled based on the drawing data DR contained in the frame (N) and applying the voltage having the magnitude Vi(N+1) to the red laser driver 20R when the red laser diode 40R is controlled based on the drawing data DR contained in the frame (N+1), allows the power consumed in the red laser driver 20R to be reduced. The power consumed in the green laser driver 20G and the blue laser driver 20B can be similarly reduced. The power consumption in the rear-projection projector 100 can thus be reduced.

B. Variations

The invention is not limited to the embodiment described above, but can be implemented in a variety of aspects to the extent that they do not depart from the spirit of the invention.

1. In the embodiment described above, the light source is a laser diode, but not limited thereto. For example, the light source may be an LED or any other suitable light source. Further, the embodiment described above illustrates the configuration in which one laser scanner 70 is used for the three laser diodes 40R, 40G, and 40B, but the configuration is not limited thereto. For example, a scanner may be provided for each of the laser diodes 40R, 40G, and 40B.

2. The embodiment described above illustrates the case where the red image processing circuit 10R determines the magnitude of the output voltage Vcc from the red laser power supply circuit 30R on a frame basis, but the cycle in which the voltage magnitude is determined is not limited thereto. For example, the voltage magnitude may be calculated on a multiple frame basis, or the voltage magnitude may be calculated when the scene is changed. Further, when the red laser power supply circuit 30R responses at a high speed, the voltage magnitude may be calculated, for example, on a scan line basis or on a multiple scan line basis, or even on a pixel basis.

3. In the embodiment described above, the magnitude Vi(n) of the output voltage Vcc from the red laser power supply circuit 30R is determined based on the maximum intensity Im(n) during a single frame, but the method for determining the voltage magnitude Vi(n) is not limited to the way described in the above embodiment. For example, a predetermined voltage may be determined based on the grayscales of the image data VR, and the output voltage may be determined based on the predetermined voltage. Alternatively, the grayscales of the image data VR may be divided into predetermined sections, for example, the grayscales 0 to 7 are contained in a first section and the grayscales 8 to 15 are contained in a second section. A predetermined voltage may then be determined in accordance with the section to which the maximum grayscale in a single frame belongs. The power consumption in the red laser driver 20R can be reduced this way as well, whereby the power consumption in the rear-projection projector 100 can be reduced.

4. The circuit configuration of the red laser driver 20R, the configuration of the red laser power supply circuit 30R, and the DC-DC converter 34R in the embodiment described above are not limited to those in the embodiment described above. The red laser driver 20R may be configured in any manner as long as the drive current for driving the red laser diode 40R can be controlled based on drawing data DR. Further, for example, when the DC-DC converter 34R can precisely produce a voltage according to the voltage magnitude specifying signal ER, the red laser power supply circuit 30R may not necessarily include the controller 32R or the voltage monitor 36R. Further, the DC-DC converter 34R may be configured in any manner as long as it can produce a voltage according to the control signal CR.

The entire disclosure of Japanese Patent Application No. 2008-106778, filed Apr. 16, 2008 is expressly incorporated by reference herein.

What is claimed is:

1. An image display apparatus comprising:
a light source;
a scanner that scans an output beam emitted from the light source to form an image on a projection surface;
a light source driver that controls intensity of the output beam emitted from the light source by controlling a drive current for driving the light source based on input image data with no relation to variations in a power supply voltage;
a light source drive power supply that supplies the power supply voltage to the light source driver; and
a voltage controller that controls the light source drive power supply to output the power supply voltage based on variations in the input image data.

2. The image display apparatus according to claim 1, wherein
when the input image data are divided into predetermined data units, the voltage controller controls the power supply voltage to have a fixed voltage magnitude based on the image data that belong to each of the predetermined data units.

3. The image display apparatus according to claim 2, wherein
the fixed voltage magnitude is determined based on the maximum intensity among intensities of the output beam emitted from the light source and corresponding to the image data that belong to the predetermined data unit.

4. A voltage control method used in an image display apparatus including a light source, a light source driver that controls intensity of an output beam by controlling a drive current for driving the light source based on input image data with no relation to variations in a power supply voltage, a light source drive power supply that supplies the power supply voltage to the light source driver, and a scanner that scans the output beam emitted from the light source, the voltage control method for controlling the power supply voltage supplied from the light source drive power supply to the light source driver, the method comprising:
(a) when the input image data are divided into predetermined data units, detecting the maximum intensity among the intensities of the output beam emitted from the light source and corresponding to the image data that belong to each of the predetermined data units;
(b) calculating a value specifying the power supply voltage from the light source drive power supply based on the maximum intensity detected in (a); and (c) controlling the power supply voltage from the light source drive power supply to have the power supply voltage specifying value calculated in (b).

* * * * *